United States Patent
Bakka et al.

(10) Patent No.: US 7,060,906 B2
(45) Date of Patent: Jun. 13, 2006

(54) INTEGRATED COMMUNICATIONS AND POWER SYSTEM

(75) Inventors: Olav Bakka, Oslo (NO); Truls Norman, Oslo (NO)

(73) Assignee: Aker Kvaerner Subsea AS, Lysaker (NO)

( * ) Notice: Subject to any disclaimer, the term of this patent is extended or adjusted under 35 U.S.C. 154(b) by 0 days.

(21) Appl. No.: 10/516,639

(22) PCT Filed: Jun. 16, 2003

(86) PCT No.: PCT/NO03/00199

§ 371 (c)(1),
(2), (4) Date: Nov. 30, 2004

(87) PCT Pub. No.: WO03/106813

PCT Pub. Date: Dec. 24, 2003

(65) Prior Publication Data

US 2005/0183879 A1 Aug. 25, 2005

(30) Foreign Application Priority Data

Jun. 17, 2002 (NO) ................. 2002-2909

(51) Int. Cl.
*H01B 11/02* (2006.01)

(52) U.S. Cl. .................. 174/113 R
(58) Field of Classification Search ........ 174/113 R, 174/102 R, 106 R; 336/205, 206
See application file for complete search history.

(56) References Cited

U.S. PATENT DOCUMENTS

| 3,548,158 A | | 12/1970 | McCaskill |
| 3,565,118 A | | 2/1971 | Stearns |
| 4,194,536 A | | 3/1980 | Stine et al. |
| 4,288,653 A | | 9/1981 | Blom et al. |
| 4,798,230 A | | 1/1989 | Hopperdietzel |
| 5,444,184 A | * | 8/1995 | Hassel ............ 174/113 R |
| 5,515,038 A | | 5/1996 | Smith |
| 5,521,592 A | | 5/1996 | Veneruso |
| 5,813,106 A | | 9/1998 | Haug et al. |
| 5,949,327 A | | 9/1999 | Brown |
| 6,249,913 B1 | * | 6/2001 | Galipeau et al. ........... 725/76 |

FOREIGN PATENT DOCUMENTS

| WO | WO 00/33108 | 6/2000 |
| WO | WO 01/03323 A1 | 1/2001 |
| WO | WO 01/16515 A1 | 3/2001 |

OTHER PUBLICATIONS

UK Patent Office, Patents Act 1977 Examination Report under Section 18 (3) dated Jun. 30, 2005, of Patent Application No. GB0427058.3.
PCT Search Report dated Aug. 25, 2003 of Patent Application No. PCT/NO03/00199 filed Jun. 17, 2002.
Norwegian Search Report dated Feb. 13, 2003 of Patent Application No. NO 2002 2909 filed on Jun. 16, 2003.

* cited by examiner

*Primary Examiner*—Chau N. Nguyen
(74) *Attorney, Agent, or Firm*—Maine & Asmus

(57) ABSTRACT

In order to avoid signal disturbances at communications through electric high power cables for supply of electric power to offshore installations, power cables that are galvanically insulated from each other are used. For example this may be done by supplying power at two single-phase pairs and use one conductor in every pair as signal conductor or by using a three-phase cable plus a single conductor.

16 Claims, 3 Drawing Sheets

INTEGRATED COMMUNICATIONS AND POWER SYSTEM

RELATED APPLICATIONS

This application claims priority to Norwegian Patent Application 20022909 filed Jun. 17, 2002 and claims the benefit of PCT Application Ser. No. PCT/NO03/00199, filed Jun. 16, 2003, which are incorporated herein in their entirety by reference.

FIELD OF THE INVENTION

The present invention relates to a system that combines transmission of power and signals via a custom designed cable configuration to offshore, especially subsea located control units.

BACKGROUND OF THE INVENTION

To reduce the outlet of carbon dioxide and other environmentally unfriendly gases, the authorities have encouraged and imposed a supply of electrical power from onshore power plants to offshore installations. For a subsea installation a power supply via a cable from land is usually the only possibility.

In addition to the power supply offshore installations are more and more dependent on data communication with land based facilities. Subsea installations may be fully controlled from land. This requires a large amount of data to be sent between the installation and land.

The principle of simultaneously utilizing power transmission cables and lines for communication purposes is commonly known under the terms "comms-on-power" or PLC (Power Line Carrier). Onshore this has been performed since long ago. Offshore it is typically applied as supplement to optical fiber cable, but may also be installed as the only system. Installed as the only system it has certain technical advantages, e.g. it may reduce the number of subsea wet mateable connectors required. The power and communications is subsequently distributed to each control unit.

Over very long distances—typically above 100 km—a combined power supply and signal communication is very difficult and the signals are subjected to disturbance from the electric current. On shore this can be solved by inserting amplifiers at certain intervals. Offshore amplifiers are not desired, since this would mean installing delicate equipment at the seabed where access for maintenance is extremely difficult.

BRIEF SUMMARY OF THE INVENTION

The present invention aims to solve this problem without or at least with a substantially reduced need for amplification of the communication signals.

The invention provides overall system design considerations and implementations that have been made to achieve and optimize the above described dual functionality by utilizing a set of, preferably, four copper conductors for both power and communication signal transfer.

A further advantage of the present invention is that utilization of two conductor pairs introduces redundancy and robustness both with respect to power supply and communication, enabling continued operation of the ICPS (Integrated Communications and Power System) after the occurrence of a single failure.

One embodiment of the present invention is an Integrated Communication and Power System, comprising at least one first transformer located on shore, at least one second transformer located offshore, with at least four single conductors connecting the first transformer with the second transformer, wherein at least four of those single conductors conduct electric power and communication signals. Four of these single conductors are arranged in pairs and conduct electric power, the pairs being galvanically insulated from each other, and the communication signals being conducted in one conductor of at least one pair. Filters are coupled to the first transformer and the second transformer.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The invention will now be described in detail under reference to the accompanying drawings illustrating embodiments of the invention, in which.

DETAILED DESCRIPTION OF THE INVENTION

Figure 1:
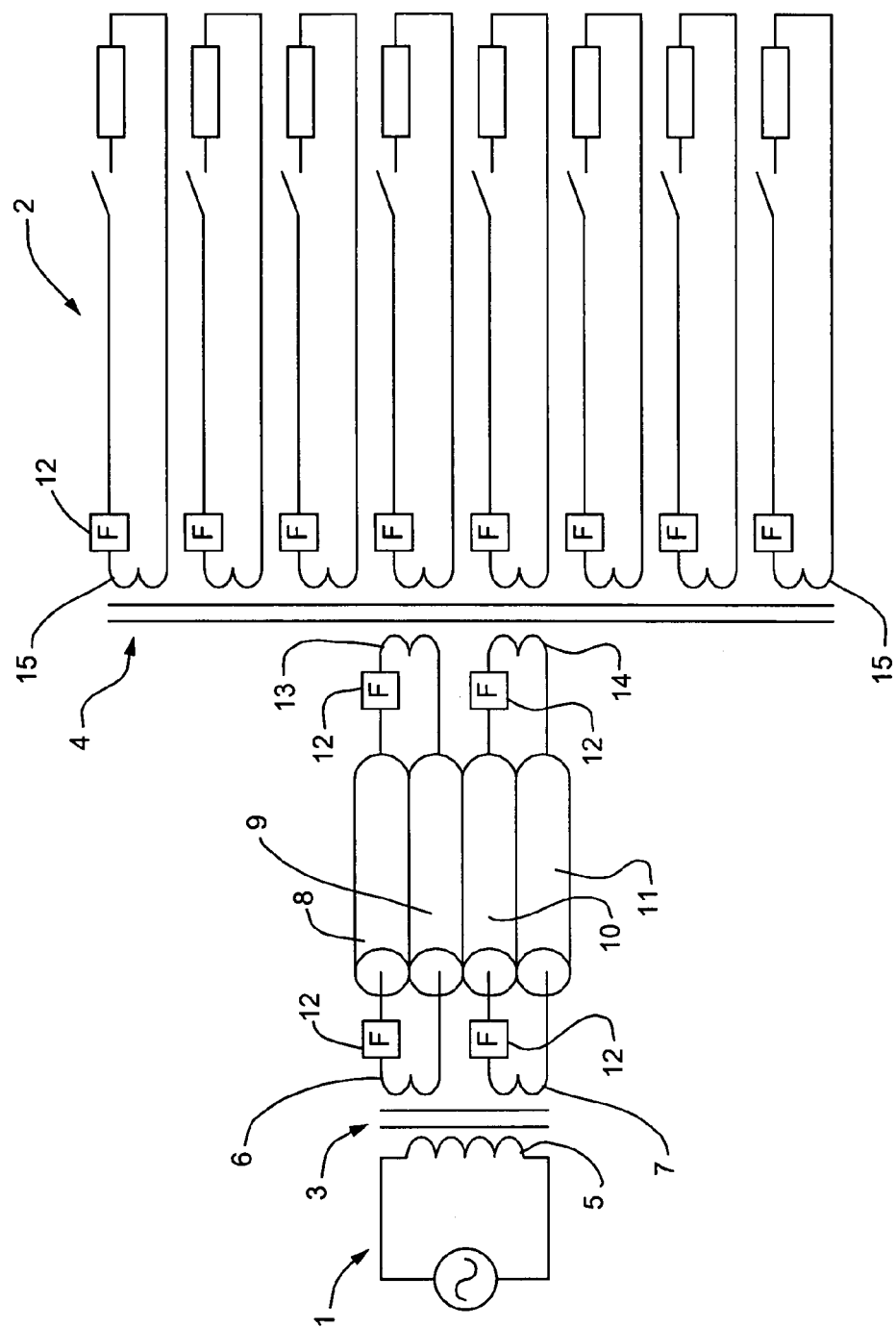
FIG. 1 shows a first embodiment in a so-called quad arrangement.
Figure 2:
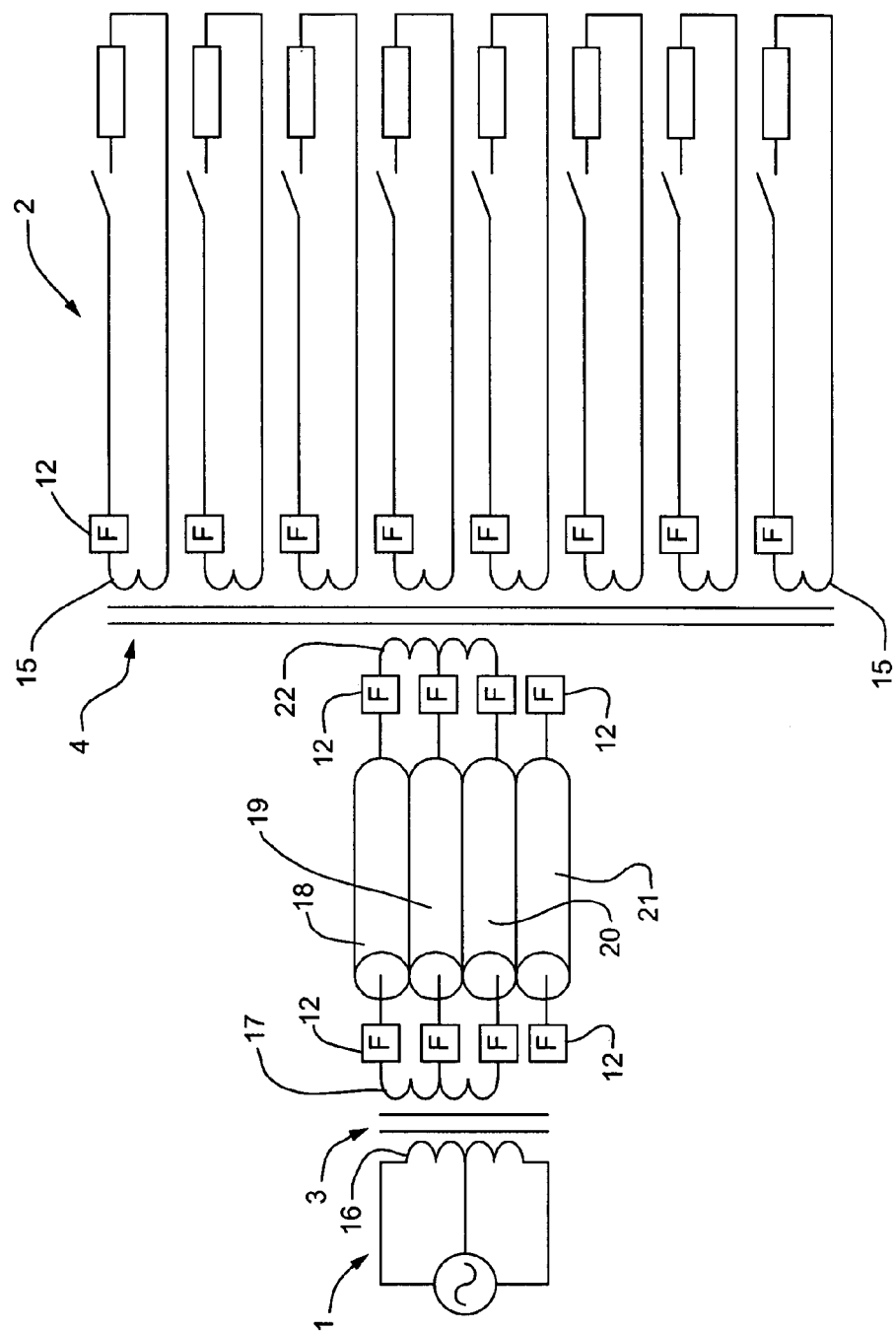
FIG. 2 shows an alternative embodiment in a 3 phase plus single cable arrangement.

Two alternative ways of arranging the conductors are shown in FIGS. 1 and 2, respectively; FIG. 1 showing a quad system with two pairs of conductors and FIG. 2 showing a three phase arrangement with an additional single conductor. In both alternatives the connections are arranged and connected in an unusual way to obtain the desired ICPS system optimum. The 3 phase+1 conductor system can be used for longer distance than the quad in the cases where the cable insulation has an outer semiconductor.

As illustrated in FIGS. 1 and 2, the ICPS power is supplied at the onshore/topside end 1 and extracted at the subsea end 2 via multi-winding, load-balancing transformers 3 and 4.

In the embodiment of FIG. 1 the transformer 3 has a primary winding 5 and two secondary windings 6 and 7. The secondary windings are connected to a respective pair of conductors 8, 9 and 10, 11. Each of the secondary windings 6, 7 is equipped with a filter 12. The transformer 4 has two primary windings 13 and 14 and a plurality of secondary windings 15. Each of the primary windings 13, 14 and each of the secondary windings 15 is equipped with a filter 12.

The secondary windings 15 distribute power and signals to the various equipment on the installation.

In the embodiment of FIG. 2 the transformer 3 has three phase primary winding 16 and a three phase secondary winding 17. The three phase secondary winding 17 is connected to three conductors 18, 19 and 20. In parallel to the three conductors 18, 19, 20 is a single conductor 21. At each end of the conductors 18–21 is a filter 12.

The transformer 4 has a three phase primary winding 22 and a plurality of single phase secondary windings 15. Each of the secondary windings is equipped with a filter 12. As for the embodiment of FIG. 1, the secondary windings 15 are distributing power and signals to the various equipment on the installation.

Figure 3:
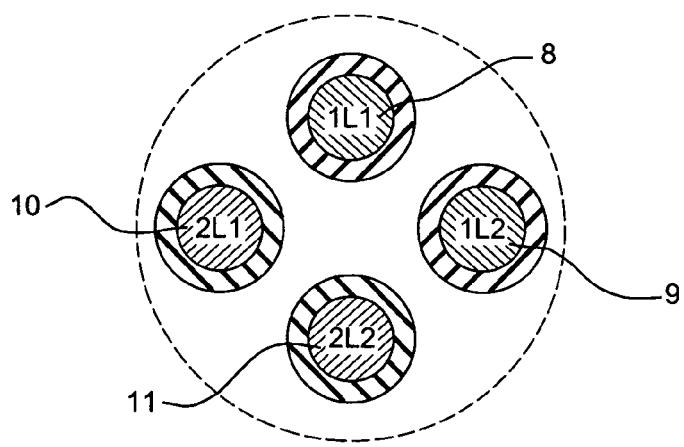
FIG. 3 shows schematically a cross section through a cable implementing the arrangement for FIG. 1.

FIG. 3 show schematically a cross section through the cable containing the conductors 8–11 in FIG. 1. In this FIG., 1L1 and 1L2 denotes the two conductors 8 and 9 respectively, and 2L1 and 2L2 denotes the two conductors 10 and 11, respectively.

Figure 4:
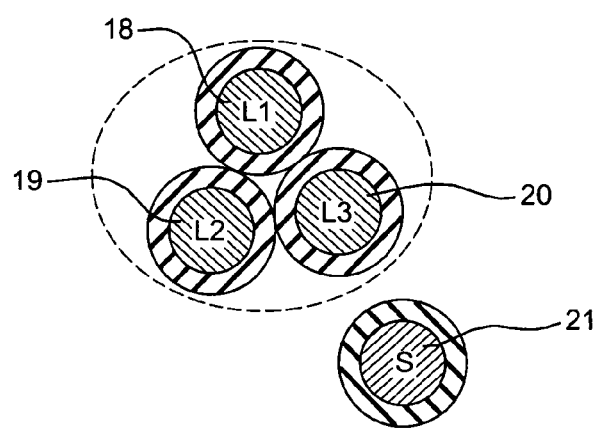
FIG. 4 shows schematically a cross section through a cable implementing the arrangement for FIG. 2.

FIG. 4 shows schematically a cross section through a cable containing the conductors 18–21 in FIG. 2. In this figure L1, L2 and L3 denote the conductors 18, 19 and 20, respectively, and S denotes the single conductor 21.

The conductors are preferably integrated in a common cable, like the one described in Norwegian Patent Application No. 20020781, incorporated in its entirety by reference.

Figure 5:
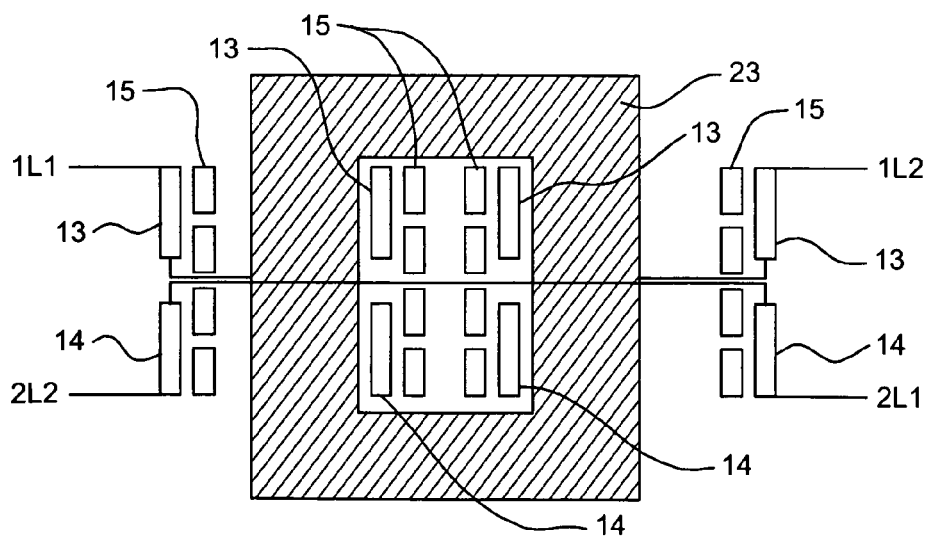
FIG. 5 shows schematically a transformer to be used with the arrangement of FIG. 1.

FIG. 5 shows schematically a transformer useful as the transformer 4 in FIG. 1. The transformer comprises an iron core 23, a first primary winding 13, a second primary winding 14 and a plurality of secondary windings 15.

The function and characteristics of the ICPS can be described as follows: Fixed frequency power for energizing and operation of subsea located control and communication devices is supplied to the primary winding. The connection of the power is different from the connection of the comm's on power.

a) quad: The fixed frequency power is transferred on two insulated copper conductor pairs contained in a single cable. Each pair is supplied from a dedicated power transformer winding, meaning that the two pairs are galvanically separated from each other. A filter for insertion of the communications signals is connected in-between each transformer winding and conductor pair.

b) 3+1: Power is supplied as a standard 3 phase supply. A separate core solely used for the comms' on power system forms part of the umbilical.

Transfer of communication signals within a designated frequency band is via the same set of conductors used for power transmission in the quad embodiment and via the single conductor in the 3+1 embodiment.

Power and communication signals are separated at both cable ends by means of termination to custom designed filters.

The cable leading from an onshore or topside located power source is connected to a custom designed, multi-winding power transformer at its subsea located end.

a) For the quad: An integrated power and signal cable having four insulated copper conductors in fixed radial position relative to each other along the full length of the cable, as illustrated by the cross-section in FIG. 3. The conductors are operated in pairs as indicated, both with respect to power supply and communications signals. The signals use one conductor in each pair, thus using galvanic separated signal conductors with minimum interference of the signal.

b) For the 3+1: As illustrated by the cross-section in FIG. 4 the single core is not located close to the 3 cores used for the power supply. The distance between the single core and the 3 power cores is determined by a number of factors such as: minimum umbilical outer diameter, minimum capacitance, and minimum inductance. The advantage is that the distance between the 3 cores and the standalone core can be varied, thus inductance for the comms system can be optimized.

The subsea multi-winding transformer design illustrated by FIGS. 1 and 2 ensures that all subsea located control units are galvanically separated, and thus that the consequences of a single fault is limited to the faulty consumer.

a) For the quad: The split primary winding connections, winding 1 marked 1L1, 1L2 and winding 2 marked 2L2, 2L1 (see FIG. 5), means that any control unit can be fed from either power transmission conductor pair, thus limiting the effect of a single failure to any one of these pairs. (In the traditional case of a single primary winding and parallel connected power transmission conductor pairs, this robustness would be lost.)

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. Integrated communication and power system, comprising:
at least one first transformer located on shore, at least one second transformer located offshore, at least four single conductors connecting the first transformer with the second transformer, said at least four single conductors conducting electric power and communication signals, wherein four of said at least four single conductors are arranged in pairs, said pairs being galvanically insulated from each other, and the communication signals being conducted in one conductor of at least one said pair, and wherein first transformer filters are coupled to said first transformer and second transformer filters are coupled to said second transformer.

2. The system according to claim 1, wherein the at least four single conductors form at least two pairs in a double single phase quad arrangement.

3. The system according to claim 1, wherein said at least four single conductors are in a substantially fixed radial position relative to each other in a length of a cable.

4. The system according to claim 1, wherein said second transformer has a plurality of secondary windings.

5. The system according to claim 4, wherein said plurality of secondary windings of said second transformer each have a filter.

6. The system according to claim 4, wherein an offshore control unit is fed from said secondary windings.

7. The system according to claim 1, wherein said communication signals are conducted from one conductor in each of said pairs.

8. The system according to claim 1, wherein said at least four single conductors are insulated copper lines and integrated into a subsea cable.

9. A power and communications system for offshore installations, comprising:
an onshore power and communication installation coupled to an onshore multi-winding load-balancing transformer;
an offshore power and communication installation coupled to an offshore multi-winding load-balancing transformer;
at least one control unit coupled to said offshore multi-winding load-balancing transformer;

a plurality of single insulated conductors housed within a core and coupled on a first end to said onshore multi-winding load-balancing transformer and coupled on a second end to said offshore multi-winding load-balancing transformer, wherein said single insulated conductors housed within a core conducts power;

at least one single insulated conductor proximate said core and coupled on a first end to said onshore power and communication installation and coupled on a second end to said offshore power and communication installation, wherein said at least one single insulated conductor conducts communications; and wherein said plurality of single insulated conductors housed within a core and said at least one single insulated conductor proximate said core form a subsea cable.

10. The system according to claim 9, wherein said onshore multi-winding load-balancing transformer comprises an onshore multi-phase primary winding and an onshore multi-phase secondary winding.

11. The system according to claim 10, wherein each of said onshore multi-phase secondary windings has a filter.

12. The system according to claim 9, wherein said offshore multi-winding load-balancing transformer comprises an offshore multi-phase primary winding and a plurality of offshore single phase secondary windings.

13. The system according to claim 12, wherein each of said offshore single phase secondary windings has a filter.

14. The system according to claim 12, wherein each said offshore multi-phase primary winding has a filter.

15. The system according to claim 9, wherein there are three single insulated conductors housed within said core forming a three phase power connection.

16. The system according to claim 9, wherein a radial distance between said single insulated conductor and said plurality of single insulated conductors housed within a core is optimized for communications.

* * * * *